J. L. SWARTZ.
CUSHION TIRE AND PROCESS OF PRODUCING THE SAME.
APPLICATION FILED JULY 19, 1917.
1,268,298.
Patented June 4, 1918.
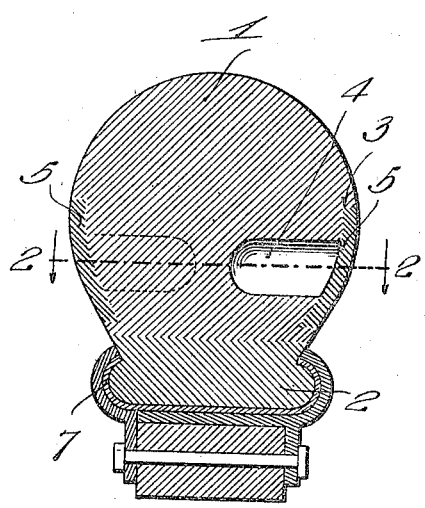
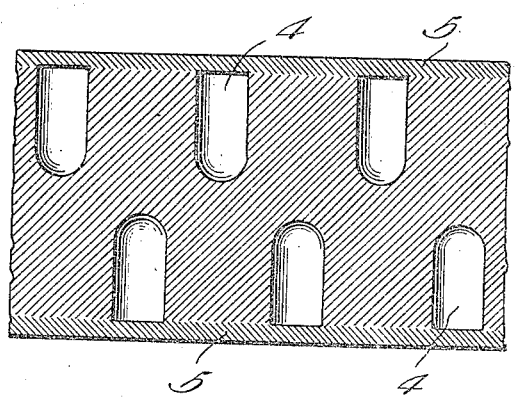
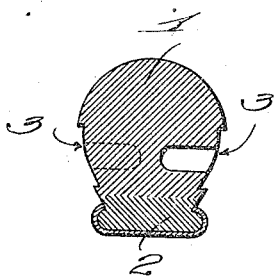
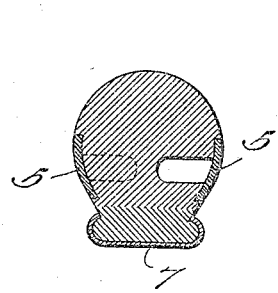
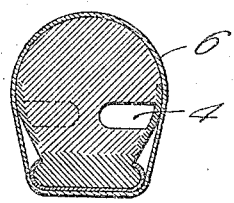
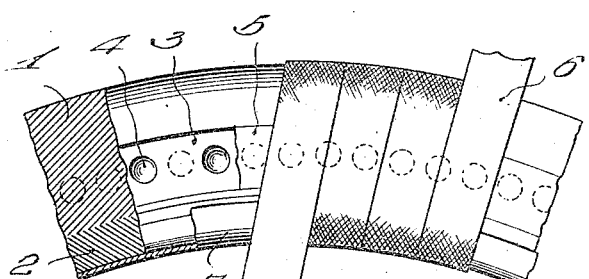
Inventor
J. L. Swartz

UNITED STATES PATENT OFFICE.

JOHN L. SWARTZ, OF AKRON, OHIO.

CUSHION-TIRE AND PROCESS OF PRODUCING THE SAME.

1,268,298.     Specification of Letters Patent.     Patented June 4, 1918.

Application filed July 19, 1917. Serial No. 181,597.

*To all whom it may concern:*

Be it known that I, JOHN L. SWARTZ, a citizen of the United States, residing at Akron, in the county of Summit and State of Ohio, have invented certain new and useful Improvements in Cushion-Tires and Processes of Producing the Same; and I do declare the following to be a full, clear, and exact description of the invention, such as will enable others skilled in the art to which it appertains to make and use the same.

My invention relates to improvements in cushion tires and the methods of constructing the same, the object being to provide a cushion tire whose resiliency is increased by a plurality of transverse air pockets, and to seal the outer ends of said pockets so as to prevent the escape of air and at the same time to exclude mud and other deleterious matter.

With the foregoing general object in view the invention resides in the novel features of construction and in the method hereinafter fully described and claimed, the descriptive matter being supplemented by the accompanying drawing which forms a part of this specification and in which:

Figure 1 is a vertical transverse section of the improved tire applied to an automobile rim;

Fig. 2 is a sectional view on the plane of the line 2—2 of Fig. 1;

Figs. 3, 4 and 5 are transverse sections showing three different steps in the manufacture of the article; and Fig. 6 is a side elevation of Fig. 5.

In the manufacture of the improved tire, the body thereof which is designated by the numeral 1, is molded in a suitable cast, not shown, the rim engaging portion of said body, designated by the numeral 2, being formed of a harder grade of rubber than the body 1. Shallow circumferentially extending channels 3 are formed in the sides of the tire body 1, during the molding operation, and said body is also provided with a plurality of transverse air pockets 4, the inner ends of said pockets being positioned at substantially the center of the tire body, whereas the outer ends thereof open into the channels 3. The pockets 4 on the opposite sides of the tire, are preferably though not necessarily disposed in staggered relation as will be clear from Fig. 2.

After molding the parts above described, they are semi-cured, after which the channels 3 are filled with flat semi-cured rubber rings 5, the outer surfaces of said rings being flush with the corresponding surface of the tire as shown clearly in the drawing. After applying the rings 5 as shown in Fig. 4, the tire is placed in a mold or is wrapped with tape, cord, or any other suitable material, as indicated in Figs. 5 and 6 of the drawings. The wrapping of the tire retains the rings 5 in proper position, so that when the final baking or curing of the tire is done, the rings will be vulcanized to the bottoms and edges of the channels, thus forming an effective seal for the outer ends of the pockets 4. After the curing process, the winding is removed, suitable provision being made beforehand, for preventing adhering of said winding to the tire body.

By constructing the improved tire in the manner above described, it will be obvious that it may be easily and inexpensively manufactured, and that the complete article will be highly efficient. The air pockets 4 greatly increase the resiliency of the tire and since the outer ends of said pockets are sealed, there is no danger whatever of the air escaping therefrom, or of sand, gravel, mud, and other deleterious matter entering said pockets. The air pockets and the novel means for sealing them, are preferably employed in connection with a tire having a comparatively hard rubber base 2, but it is to be understood that said pockets and the sealing means therefor, would operate to equal advantage on cushion tires of other construction. Furthermore, the base 2 is by preference provided with a metallic wear plate or supplemental rim such as that indicated at 7 in the drawings, but here again, is a feature of construction which is by preference used, although it could well be omitted should occasion demand.

In conclusion, I will state that although the specific features of construction shown and described constitute the preferred form of the improved tire, numerous minor changes may be made within the scope of the invention as claimed, without sacrificing the principal advantages.

I claim:

1. A one piece cushion tire comprising a tire body molded from rubber, said body having a shallow circumferential channel in each of its sides and transverse air pockets opening into said channels, and flat rubber rings filling said channels and vulcanized to the entire area of the sides and bottoms thereof to seal the outer ends of said pockets.

2. The method of constructing a one piece cushion tire having sealed transverse air pockets, consisting in so molding the tire body from rubber as to provide said body with shallow circumferential channels in its sides and with transverse air pockets opening into said channels, inserting flat rubber rings in the channels, and vulcanizing said rings to the entire area of the bottoms and edges of said channels.

In testimony whereof I have hereunto set my hand in the presence of two subscribing witnesses.

JOHN L. SWARTZ.

Witnesses:
 JACOB HEDDESHEIMER,
 RUTH HEDDESHEIMER.